United States Patent Office 3,013,067
Patented Dec. 12, 1961

3,013,067
PROCESS FOR PRODUCING ACRYLIC ACID ESTERS
Jesse T. Dunn, Charleston, W. Va., assignor to Union Carbide Corporation, a corporation of New York
No Drawing. Filed Mar. 23, 1959, Ser. No. 800,942
3 Claims. (Cl. 260—486)

This invention relates to the production of acrylic acid esters. More particularly it is concerned with new catalysts for carrying out the interaction of acetylene, carbon monoxide and an alcohol to produce acrylic acid esters.

It is well known that acrylic acid and its esters can be produced by the reaction of acetylene and carbon monoxide with compounds having a replaceable hydrogen, such as water, alcohols, carboxylic acids, ammonia and amines, in the presence of a metal carbonyl catalyst, or other catalysts such as the complex triphenylphosphine-nickel halide compounds or the complex nickel halide-quarternary ammonium compounds.

It has now been found that the complex combinations obtained by the admixture of a nickel halide with an aliphatic isonitroso compound or the nickel salt thereof are excellent catalysts for the production of acrylic acid esters. The aliphatic isonitroso compounds which can be used are the dialkylglyoximes represented by the general formula:

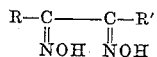

and the nickel salts thereof as represented by the general formula:

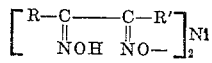

wherein R and R' represent alkyl radicals containing from 1 to about 20 carbon atoms, preferably from 1 to about 8 carbon atoms.

Illustrative of the compounds which can be used are dimethylglyoxime, dipropylglyoxime, nickel dimethylglyoxime, nickel dipropylglyoxime, and the like.

The catalyst complexes suitable for use in this invention are prepared by admixing a nickel halide, such as nickel bromide, nickel fluoride, nickel chloride and nickel iodide, with one or more of the above-defined aliphatic isonitroso compounds. In preparing the catalyst complex the order of addition of the two components is not critical; and when the nickel salt of the aliphatic isonitroso compound is employed as the catalyst this problem does not present itself. Thus the aliphatic isonitroso compound can be added initially to the alcohol reactant to be used in producing the acrylic acid ester, followed by the nickel halide component, or the reverse order of addition can be followed. The acrylic acid esters are then produced by the interaction of acetylene with carbon monoxide and the alcohol at elevated temperature and under increased pressure in the presence of a catalytic amount of the catalyst complex. The use of the catalyst complexes of this invention results in a high ratio of monomer to polymer.

The starting alcohols are preferably the aliphatic monohydroxy saturated alcohols and ether alcohols having up to about 22 carbon and preferably from 1 to about 12 carbon atoms in the molecule. Illustrative alcohols are ethanol, isopropanol, ethylene glycol monomethyl ether, ethylene glycol monoethyl ether, ethylene glycol monobutyl ether, and the like.

The reaction is successfully carried out with the catalyst complexes of this invention at temperatures of from about 90° C. to about 250° C. or higher. Temperatures of from about 100° C. to about 200° C. are preferred. The reaction can be expedited by the use of slight pressures, and we prefer to operate at pressures exceeding about 100 p.s.i.g., with pressures of from about 400 p.s.i.g. to 500 p.s.i.g. most preferred. Higher pressures up to about 4000 p.s.i.g. to 5000 p.s.i.g. can be used with proper precautions.

The mole ratio of nickel halide to aliphatic isonitroso compound can be varied over wide limits, and does not appear to be critical; nevertheless, we prefer to employ about equimolar amounts of each component. The total amount of catalyst complex charged to the reaction mixture is not critical, and can be varied over a wide range, so long as a catalytic amount is present. When based on the alcohol charged, it has been found that a catalyst complex containing about 0.0622 mole each of the nickel halide and the organic heterocyclic compound per 16 moles of alcohol yields the highest conversions from an economical viewpoint. Higher concentrations of catalyst give a faster reaction, but at greater cost, while lower concentrations, though more economical, result in lower productivity.

The reaction can be carried out in a batchwise manner or in a continuous manner by methods which are known to the art. The acetylene and carbon monoxide can be added separately, or for reasons of safety, as a mixture of gases, which mixture can be widely varied.

The following examples further serve to illustrate this invention. Parts are by weight unless otherwise specified.

Example 1

A three-liter stainless steel rocking autoclave was charged with 740 g. of ethanol, 5.6 g. of mercuric bromide and 9.6 g. of butyl bromide. Then 6.8 g. of nickel bromide and 3.9 g. of dimethylglyoxime were added to prepare the catalyst complex and the autoclave was sealed and purged, first with carbon monoxide and then with a 1:1 mixture, by volume, of acetylene and carbon monoxide. The autoclave was rocked and the pressure was increased to about 40 p.s.i.g. by the further addition of the acetylene-carbon monoxide mixture. The gas addition was stopped, and the autoclave was heated to 100° C., at which time the pressure was increased 25 p.s.i.g. by the addition of acetylene. The total pressure was then increased to about 300 p.s.i.g. with the acetylene-carbon monoxide mixture, and heating was continued to a temperature of about 150° C. At this point the pressure was increased to 450 p.s.i.g. and maintained between 400 p.s.i.g. to 450 p.s.i.g. by the periodic addition of acetylene-carbon monoxide mixture for 4 hours. During this period the temperature was kept between 158° C. to 162° C. The reaction was stopped by air cooling the autoclave and then releasing the pressure. The reaction mixture was filtered and filtrate was distilled to separate monomeric ethyl acrylate, most of which distilled as the ethyl acrylate-ethanol azeotrope, from the higher boiling acrylate esters and polymer-containing residue. The yield of monomeric ethyl acrylate was 376 g.

Example 2

In the manner described in Example 1, 740 g. of ethanol containing 5.6 g. of mercuric bromide and 9.6 g. of butyl bromide was treated with acetylene and carbon monoxide at 164° C. to 182° C. over a 5.7 hour period in the presence of 9.0 g. of nickel dimethylglyoxime as catalyst. Yield of monomeric ethyl acrylate was 473 g.

Example 3

In the manner described in Example 1, 2-ethylhexyl acrylate is produced by reacting 2,600 g. of 2-ethylhexanol with acetylene and carbon monoxide in the presence of a catalyst complex prepared with 13.6 g. of nickel bromide and 7.8 g. of dimethylglyoxime.

What is claimed is:
1. In the manufacture of an arcylic acid ester by the reaction of acetylene with carbon monoxide and an alcohol at elevated temperature and under increased pressure, the improvement which comprises carrying out said reaction in the presence of a catalyst complex of a nickel halide and a dialkylglyoxime represented by the general formula

$$\underset{\text{NOH}\ \ \text{NOH}}{\text{R}-\text{C}-\text{C}-\text{R}'}$$

and the nickel salts thereof, wherein R and R' represent an alkyl radical containing from 1 to about 8 carbon atoms.

2. The method as claimed in claim 1, wherein the reaction is carried out in the presence of dimethylglyoxime.

3. The method as claimed in claim 1, wherein the reaction is carried out in the presence of nickel dimethylglyoxime.

References Cited in the file of this patent
UNITED STATES PATENTS

| | | |
|---|---|---|
| 2,493,986 | McNab et al. | Jan. 10, 1950 |
| 2,680,758 | Thomas | June 8, 1954 |
| 2,738,364 | Reppe et al. | Mar. 13, 1956 |
| 2,822,372 | Meister | Feb. 4, 1958 |
| 2,845,451 | Lautenschlager et al. | July 29, 1958 |
| 2,886,591 | Lautenschlager et al. | May 12, 1959 |